US007875321B2

(12) United States Patent
Verhoest et al.

(10) Patent No.: US 7,875,321 B2
(45) Date of Patent: Jan. 25, 2011

(54) PREPARATION OF FLEXOGRAPHIC PRINTING PLATES USING INK JET RECORDING

(75) Inventors: Bart Verhoest, Niel (BE); Bart Verlinden, Tongeren (BE); Eddi Daems, Herentals (BE); Luc Leenders, Herentals (BE); Kris Vangeel, Geel (BE); Wim Helsen, Herentals (BE)

(73) Assignee: Agfa Graphics NV, Mortsel (BE)

( * ) Notice: Subject to any disclaimer, the term of this patent is extended or adjusted under 35 U.S.C. 154(b) by 961 days.

(21) Appl. No.: 10/732,072

(22) Filed: Dec. 10, 2003

(65) Prior Publication Data

US 2004/0131778 A1 Jul. 8, 2004

Related U.S. Application Data

(60) Provisional application No. 60/436,837, filed on Dec. 27, 2002.

(30) Foreign Application Priority Data

Dec. 11, 2002 (EP) ................................ 02102717

(51) Int. Cl.

| | |
|---|---|
| ***C08J 7/18*** | (2006.01) |
| ***C08F 2/48*** | (2006.01) |
| ***C08F 2/01*** | (2006.01) |
| ***B05D 3/06*** | (2006.01) |
| ***B05D 1/02*** | (2006.01) |
| ***B05D 5/04*** | (2006.01) |

(52) U.S. Cl. .......................... 427/511; 427/9; 427/514; 427/492; 427/140; 427/427.4; 427/265

(58) Field of Classification Search ...................... None
See application file for complete search history.

(56) References Cited

U.S. PATENT DOCUMENTS 5,059,266 A * 10/1991 Yamane et al. ................ 156/64

(Continued)

FOREIGN PATENT DOCUMENTS

EP 0641648 A1 * 3/1995

(Continued)

OTHER PUBLICATIONS

J. Grant et al., editor, "Hackh's Chemical Dictionary", third edition, McGraw-Hill Book Company, Inc., New York, 1944 (Belmont), excerpt p. 295.*

(Continued)

*Primary Examiner*—Marianne L Padgett
(74) *Attorney, Agent, or Firm*—Keating & Bennett, LLP

(57) ABSTRACT

Upon a substrate subsequent layers of elastic ink are jetted using an ink jet printing system. Each layer is immobilised by a immobilisation step before jetting the following layer.

A printing relief is gradually formed to obtain a flexographic printing plate allowing accurate control over the relief and slopes of the printing plates.

Use can be made of different inks or immobilisation step to obtain different layer characteristics.

Inks can be immobilised using UV curing.

The recorded relief of the layers can be measured and corrections can be applied using a feed-back loop.

A rejuvenation process for printing plates can be constructed using the described method.

An elastic base layer can be provided on the substrate to provide better plate characteristics.

20 Claims, 8 Drawing Sheets

U.S. PATENT DOCUMENTS

| | | | | |
|---|---|---|---|---|
| 5,501,150 | A * | 3/1996 | Leenders et al. | 101/466 |
| 5,776,661 | A * | 7/1998 | Casaletto et al. | 430/306 |
| 6,033,740 | A * | 3/2000 | Oelbrandt et al. | 427/511 |
| 6,087,062 | A * | 7/2000 | Cunningham et al. | 430/270.1 |
| 6,358,668 | B1 * | 3/2002 | Leenders et al. | 430/271.1 |
| 6,360,656 | B2 * | 3/2002 | Kubo et al. | 101/35 |
| 6,387,594 | B1 * | 5/2002 | Kakishita et al. | 430/300 |
| 6,467,897 | B1 * | 10/2002 | Wu et al. | 347/102 |
| 6,551,759 | B2 * | 4/2003 | Daems et al. | 430/273.1 |
| 6,699,640 | B2 * | 3/2004 | Verschueren et al. | 430/302 |
| 6,720,042 | B2 * | 4/2004 | Ylitalo et al. | 428/32.26 |
| 6,849,308 | B1 * | 2/2005 | Speakman et al. | 427/595 |
| 6,881,458 | B2 * | 4/2005 | Ludwig et al. | 428/32.17 |
| 6,994,026 | B2 * | 2/2006 | De Voeght et al. | 101/401.1 |
| 7,682,775 | B2 * | 3/2010 | Rapp et al. | 430/302 |
| 2002/0189471 | A1 * | 12/2002 | Juffinger et al. | 101/401.1 |
| 2003/0087178 | A1 * | 5/2003 | Lungu | 430/162 |
| 2003/0211423 | A1 * | 11/2003 | Mengel et al. | 430/306 |
| 2003/0213392 | A1 * | 11/2003 | Nissing et al. | 101/483 |
| 2004/0256754 | A1 * | 12/2004 | Koguchi | 264/40.1 |
| 2004/0259033 | A1 * | 12/2004 | Kunita | 430/300 |
| 2005/0115920 | A1 * | 6/2005 | Hiller et al. | 216/10 |
| 2010/0003444 | A1 * | 1/2010 | Tsukuda et al. | 428/64.4 |
| 2010/0007692 | A1 * | 1/2010 | Vanmaele et al. | 347/21 |
| 2010/0026751 | A1 * | 2/2010 | Oyanagi | 347/16 |
| 2010/0053287 | A1 * | 3/2010 | Belelie et al. | 347/100 |
| 2010/0066791 | A1 * | 3/2010 | Jeremic et al. | 347/102 |
| 2010/0201039 | A1 * | 8/2010 | Leenders et al. | 264/401 |
| 2010/0215865 | A1 * | 8/2010 | Keoshkerian et al. | 427/511 |

FOREIGN PATENT DOCUMENTS

WO WO 2004/002746 A1 1/2004

OTHER PUBLICATIONS

Lewis, Richard J., Sr., editor, Hawley's Condensed Chemical Dictionary, 12th edition, Van Nostrand Reinhold Co., New York, 1993 (no month), excerpt p. 455.*

Webster's Ninth New Collegiate Dictionary, Merriam-Webster Inc., Springfield, Massachusetts, USA, 1990 (no month), excerpt p. 186.*

"Flexography: Principles & Practices", 1999, 5th Edition, vol. 4, pp. 25,32, and 42.

* cited by examiner

PREPARATION OF FLEXOGRAPHIC PRINTING PLATES USING INK JET RECORDING

The application claims the benefit of U.S. Provisional Application No. 60/436837 filed Dec. 27, 2002.

FIELD OF THE INVENTION

The present invention relates to a method for making flexographic printing plates.

More specifically the invention is related to provide a computer to plate system for flexography.

BACKGROUND OF THE INVENTION

Flexographic printing plates are well known for use in letterpress printing, particularly on surfaces which are soft and easily deformable, such as packaging materials, e.g., cardboard, plastic films, aluminium foils etc. Flexographic printing plates can be prepared from photopolymerisable compositions, such as those described in U.S. Pat. Nos. 4,323,637 and 4,427,759. The photopolymerisable compositions generally comprise an elastomeric binder, at least one monomer and a photo-initiator. Photosensitive elements generally have a photopolymerisable layer interposed between a support and a coversheet or multi-layer cover element. Upon image-wise exposure to actinic radiation, polymerisation, and hence, insolubilisation of the photopolymerisable layer occurs in the exposed areas. Treatment with a suitable solvent removes the unexposed areas of the photopolymerisable layer leaving a printing relief which can be used for flexographic printing.

Flexographic printing plates used to be made photomechanically wherein the image on a mask film is exposed unto a printing plate but more recently systems were developed to obtain flexographic printing plates wherein the image is directly obtained from image date stored in a computer.

In EP-A-654 150 a flexographic printing element having a incorporated IR ablatable layer and process for making a flexographic printing plate is disclosed.

An opaque IR sensitive layer is image-wise removed by e.g. a semiconductor laser followed by exposure of the photosensitive layer using a back flash UV exposure and a top UV exposure using the image-wise ablated opaque layer as a mask. The plate is then developed to obtain the finished flexographic printing plate. The top layer (black mask), the barrier layer and unexposed parts of the photosensitive layer are removed.

The obtained printing plate can then be mounted onto a press or it is possible to mount it on a sleeve adapted to be quickly mounted onto a printing press. In other systems, such as those for continuous pattern printing, the plate itself has a cylindrical shape for printing the endless image.

Several drawbacks however exist in this working method

As the printing element is prepared using coating method the resulting top layer has a smooth surface. This results in printing results having relatively low ink densities in the centre of solid areas while the edges of these solids result in a larger ink density. This can be adopted by incorporating a surface roughness during fabrication but then the same surface finish is obtained for the whole plate. It is not possible to regulate the surface finish according to image content.

When making the plate the same characteristics are obtained for the whole plate, it is impossible to adapt the plate properties for e.g. printing on a receiving layer consisting of two different materials which would require differential elasticity.

FIG. 1 illustrates a drawback of prior art flexographic printing plates. The resulting reproduction 3 of a solid 2 on the plate 1 tend to show halo effects 4 as illustrated in the upper side of FIG. 1.

A possible cause for this is that the edges of a solid 2 tend to have a lower printing pressure and thus not squeeze the ink from between the flexographic plate 1 and the printed material as hard as in the middle of the solid areas.

Smaller dots 5 are less susceptible to this effect.

Due to the nature of the exposure the edges of printing areas are not steep, which is also illustrated in FIG. 1. Because the light is spread out in the photosensitive layer the edges of the printing areas forms a slope having an angle $\alpha$. There is no way to control the angle $\alpha$ or the shape of the slope of these edges.

Another drawback is that the overall processing time is long. Especially the development and drying time can take a lot of time. In EP-A-654 150 drying times up to two hours are mentioned. Total time for making a plate can take up to 4 hours.

Elaborate steps are needed to get the final result.

The obtained printing plate has the same properties (hardness, roughness) over the entire area and depth. This can result in difficulties in adjusting the printing press settings in order to obtain a good final image without halo effect and with good reproduction of small dots.

Further drawbacks of the state of the art systems is that during fabrication of the plate brushing in presence of a solvent is performed to remove non-printing parts of the plate. During the brushing small size dots tend to wear to a non-printable height or will be removed totally due to the brushing. Although laser imagers are capable to print resolutions up to 10 dots/mm (250 dots per inch) these dots can not be printed due to the loss of small dots in the low density areas due to brushing.

When using digital plates having a carbon layer directly on top of the photopolymerisable layer small dots are even more vulnerable due to the effect of oxygen depletion during development of the plate. This causes exposed dots to be developed smaller than they are exposed and even an insufficient height is obtained to form a printable area.

It is momentarily also not possible to do these steps on a in press system.

In EP-A-641 648 a system is described which gives the possibility to make a flexographic printing plate using an inkjet system.

A photopolymeric ink is jetted onto a substrate to form a positive or negative image which is afterwards cured by UV radiation to form a positive or negative printing plate.

A printing plate is directly obtained without processing and there is no need to development or after processing etc . . .

It is possible to produce printing plates having a desired hardness and thickness.

A drawback of the system described in EP-A-641 648 is that there is no control of the finished product and thus the resulting quality is not ensured.

No control is provided over the overall topography of the produced plate neither the surface finish of the top layer.

Another problem is that during printing of the image the drops of the polymeric ink are not stable and a sharp image is difficult to form. It is impossible to obtain sharp edges as the drops are still mobile and tend to deform.

No attention is given to the problem of stability of reproducing small dots using the plate.

The produced printing plate has the same properties over the entire area of the plate.

The present invention provides a system capable of controlling the plate during production of it. Several properties of the generated flexographic printing plate can be controlled during fabrication. A plate having better properties can be produced.

SUMMARY OF THE INVENTION

The above-mentioned advantageous effects are realised by a method for flexographic printing plate using an inkjet printing system. The method includes the step of the ink jet printing system subsequently applying, on a substrate having at least one support, at least two image-wise layers of ink, wherein at least one layer of ink is applied using an ink containing an elastomer compound and each layer application step is combined with an immobilization step for immobilizing the applied layer before a subsequent layer is applied, thereby obtaining a relief on the substrate suitable for flexographic printing.

Further advantages and embodiments of the present invention will become apparent from the following description and drawings.

DETAILED DESCRIPTION OF THE INVENTION

Figure 2A:
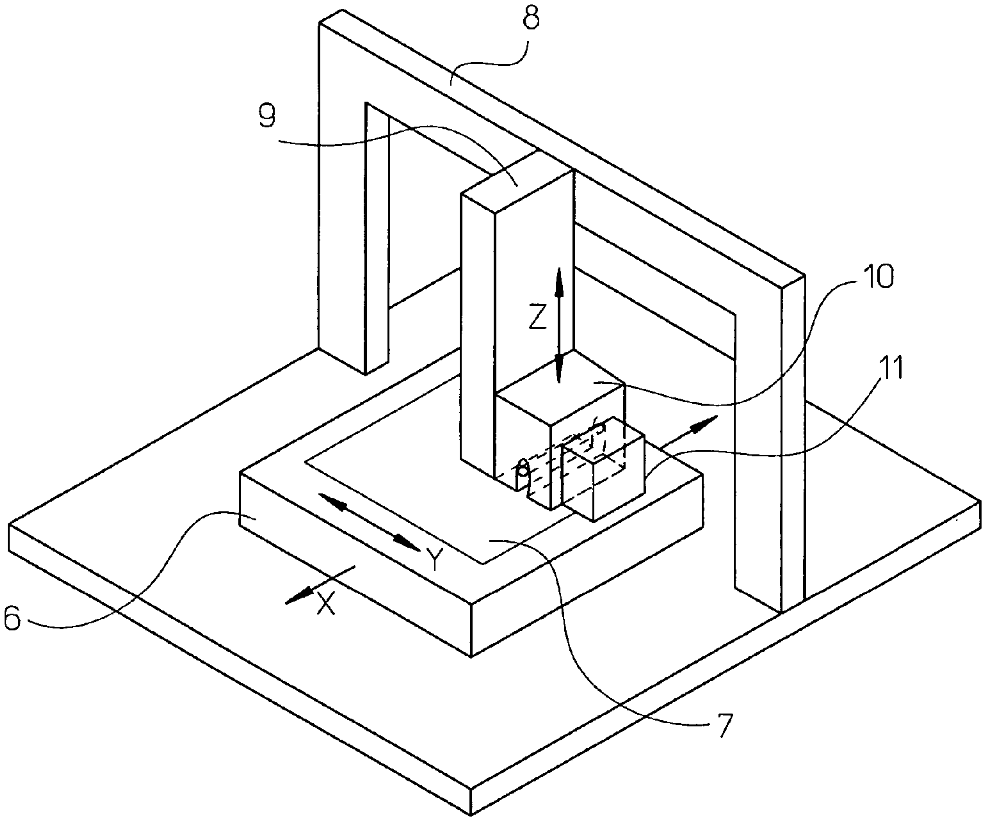
FIG. 2A shows a apparatus for making flexographic printing plates according to the present invention using a X-Y table.

A possible apparatus using an X-Y table for making flexographic printing plates using a method according to the present invention is shown in FIG. 2A.

The apparatus comprises an X-Y table 6 which can be controlled in the directions X and Y. On the table 6 a printing plate 7, comprising a support and intermediate layers, is provided. Above the table 6 is mounted a frame 8 carrying an inkjet printhead 9 which can also be controlled in the Z direction.

By moving during printing the table 6 in the Y direction as a fast scan action and moving the table 6 slowly in the X direction as slow scan a image-wise layer can be recorded on the substrate, possibly carrying already recorded layer or additional layers already on the plate 7.

A light source 10 is mounted next to and after the printhead in the fast scan direction for generating curing radiation after jetting, and a laser profilometer 11. These elements will be described later on.

Figure 2B:
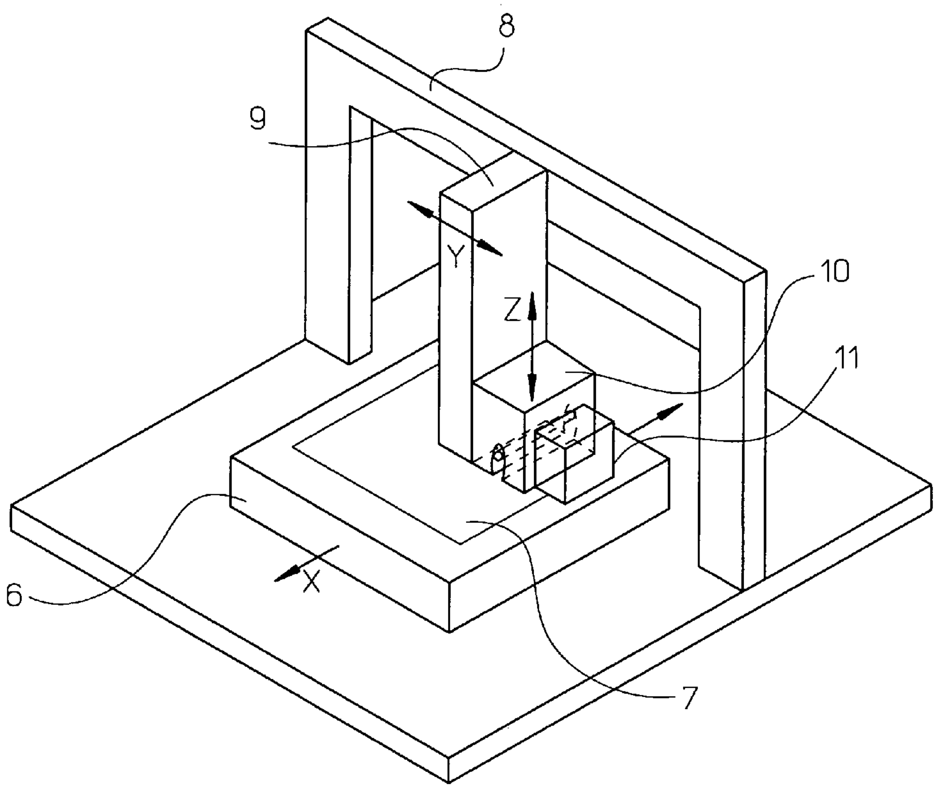
FIG. 2B shows a apparatus for making flexographic printing plates according to the present invention using a shuttling printhead

An alternative apparatus using a fast scan printhead 9 shuttling in the Y direction over a plate 7 on a slow scan table 6 moving in the X direction for making flexographic printing plates using a method according to the present invention is shown in FIG. 2B.

Movements in X and Y direction are performed by two separate translation systems 12. The printhead 9 can be controlled in the Z direction. A light source 10 and profilometer are also provided.

Figure 2C:
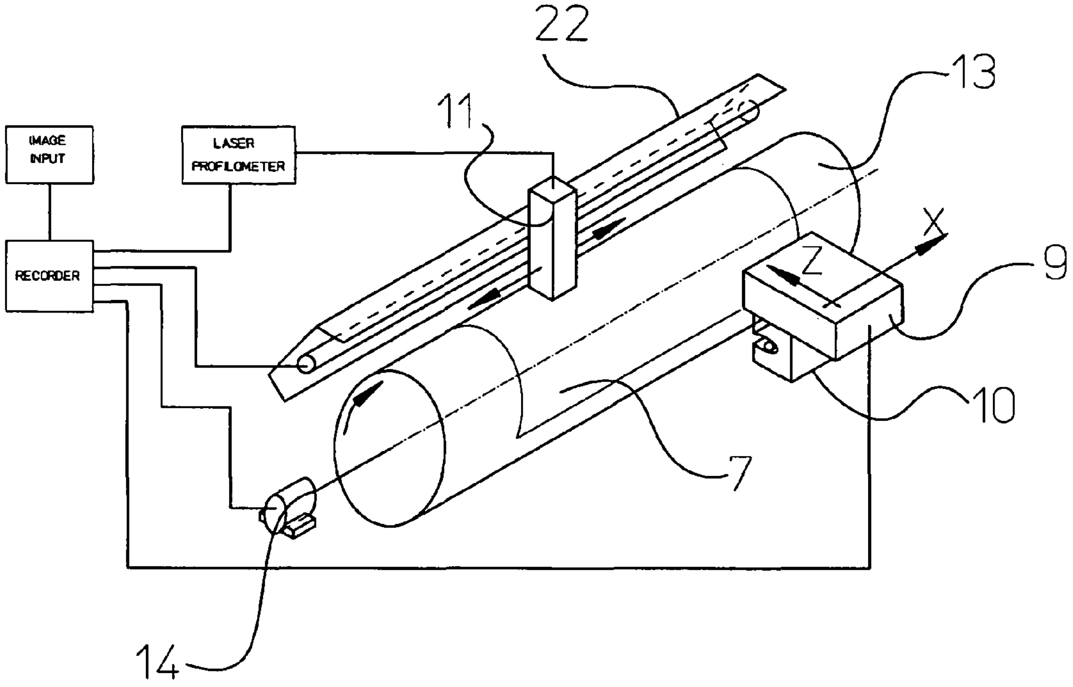
FIG. 2C shows a apparatus for making flexographic printing plates using a method according to the present invention having a drum inkjet system.

An apparatus using a drum principle for making flexographic printing plates using a method according to the present invention is shown in FIG. 2C. The drum 13 can be rotated by motor 14 thus moving the plate 7 past the printhead 9. The rotation provides the fast scan movement. The printhead 9 can move along the drum 13 in the X direction. The distance of the printhead 9 from the drum 13 can be regulated and provides movement in the Z direction.

Coupled to the printhead 9 is provided the light source 10 while here the profilometer 11 is mounted separately above the drum 13.

An extra light source 15 can be provided.

In FIG. 2*c* also some of the control modules of the recorder are shown which will be described later.

Printing is performed on a appropriate substrate comprising a support. For the drum system the support can be mounted onto the drum 13 or the support can be a sleeve fitting over the drum 13. This allows continuous printing with the finished printing cylinder afterwards.

The advantage of a drum system is that the flexographic printing plate 7 is prepared in the geometric form wherein it will be used. Plates made on a table have to be deformed to mount them on a printing press. Registering sleeves is less difficult because sleeves can be recorded versus a fixed reference and the strain which occurs during tensioning is more under control compared to flat flexoplates Hereafter different components of the system are described in more detail:

Recording Head

Upon a substrate subsequent layers of a e.g. a curable ink composition preferably containing an elastomer component are jetted by an inkjet printhead 9.

The ink has a composition providing easy jetting and resulting in the desired elastic or viscoelastic properties resilience properties of the jetted layers afterwards.

A possible inkjet printhead 9 which can be used typically has a print resolution of 720 dpi and has a multilevel capability. This means that each drop printed by the printhead 9 can have a variable but controllable volume, e.g. each drop is produced by a number of small sub-drops with a constant volume of 3 pl(picoliter) which merge in flight and become one drop.

The current head 9 can produce 16 levels of volumes, 0, 3, 6, 9, . . . 45 pl. Another head of the same product family produces droplets of 7 pl and could be used for building op the rough base structure as described later on.

Even binary heads only capable of producing drops of 80 pl can be used to produce the base structure of the printing plate which carries no image information.

Support and Intermediate Layers

The printing plate 7 comprises usually a support which can be e.g.

A PET film

A steel plate

Aluminium

A PP film or any other type of film.

Although other supports can be used, the main purpose of the support is to provide sufficient or desired rigidity to the plate, the composition is less important.

On the support preferably intermediate layers are provided to obtain a substrate appropriate for recording.

A possible type of layer functions is an elastic layer provided on the support which serves as the base of the flexographic printing plate.

The elastic layer may also be a visco-elastic layer and may be formed by a layer containing a elastomer, but also other types of elastic layers can be used.

Foam layers having a cell structure, preferably a open cell structure can provide a good base layer. Another possibility is the use of a thermoplastic elastomer. It is only important that the appropriate elasticity and resilience parameters are obtained.

This layer can provide control over the overall thickness and elasticity of the printing plate. This provides several advantages:

The layer may provide a good base layer having advantageous characteristics to receive and retain the jetted drops before and after curing.

Due to the thickness of the base layer less material has to be jetted, providing a much shorter time to produce the printing plate, only the image-wise layers, or eventually including a thin base layer have to be jetted. This allows to obtain a better plate while writing less layers onto the substrate.

The base layer may provide good elasticity combined with resilience allowing the use of less elastic ink compositions which may have better characteristics regarding to jettability or regarding curing properties. Ink having a lower percentage of e.g. elastomer component can be jetted more easily.

A further advantage is that due to the harder upper layer the small dots are more stable during printing and the number of prints which can be obtained with the plate is higher due to better wear resistance.

Some of the polyurethane open cell structures however pose problems regarding:

chemical compatibility with the press chemicals used (flexographic inks).

chemical compatibility with some types of UV hardenable inks used for making the plates Chemical incompatibility may cause undesirable swelling of layers resulting is destruction of the plate structure or art least giving deteriorated printing results.

Another problem is that the first jetted visco-elastic fluid layer for forming the plate sinks into the open cell structure. This is adversely affecting the building of the height of the relief.

Therefore these base layers are preferably covered with a thin (e.g. 5 μm) intermediate impermeable visco-elastic layer having also desirable properties regarding chemical compatibility. This layer can be applied to the base layer by e.g. coating, laminating, glueing etc. Alternatively such a layer could also be jetted on top of the base layer.

The jetted curable ink compositions may typically comprise monomer/oligomer component, e.g. pentaerythritol triacrylate, isobornylacrylate, triethyleenglycoldivinylether photoinitiator component, e.g. Genocure DEAP (Rahn), Irgacure 819 (Ciba-Geigy)

Inhibitor component, 2-methyl hydrochinon

Placticizer component, e.g. Sant5icizer 278 (Monsanto)

Elastomers binder, e.g. Cariflex TR226, Hycar1022(Goodrich)

The elastomer binder may comprise a single component or can contain a mixture of several components.

Depending upon the desired properties an appropriate component or mixture can be used.

The ink composition need not to be curable. The most important property is that drops of the ink can be immobilised before they tend to run out. This immobilisation provides the capability to form higher, more rigid structures to obtain a printing plate.

Forming of Layers

Depending on surface properties of the substrate or the preciously jetted and cured ink of the previous layers the jetted volume of the drop will cover a certain area of the substrate or underlying ink layer.

The ratio dot diameter/drop diameter is called the formfactor.

A 3 pl drop (level 1 in the multilevel system) becomes a dot with a diameter of about 30 μm and a height of less than 4 μm depending upon the type of curing, the viscosity (and temperature of substrate).

Preferably the drop volume has a range of 3 pl to 100 pl.

Figure 3:
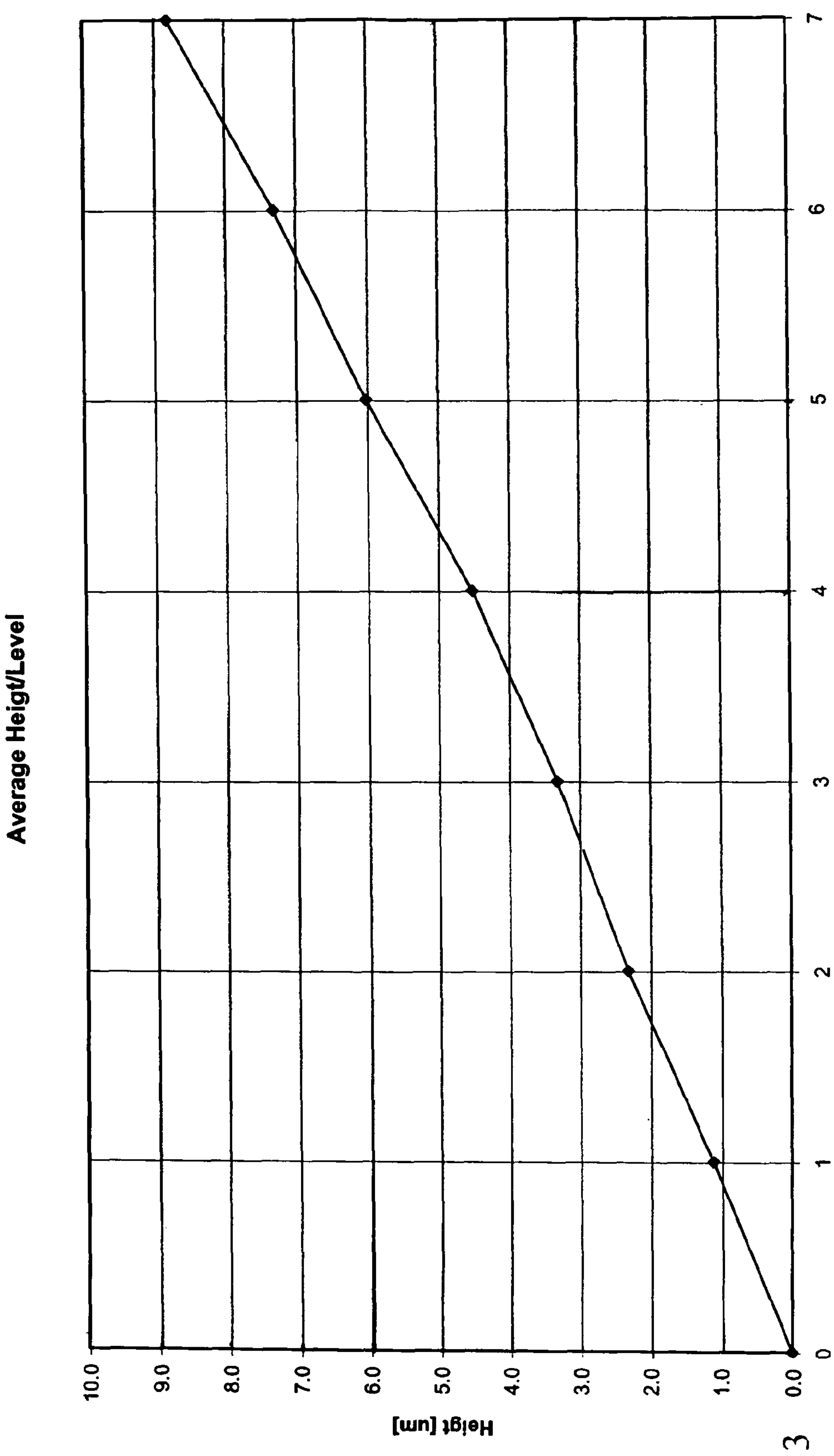
FIG. 3 gives the relation of the number of drops per dot and the dot height.

FIG. 3 gives the relation of the number of drops per dot which corresponds to the driving signal given to the actuator and the dot height. Dots are mainly formed by firing multiple drops which merge in flight to obtain a bigger drop.

Also the dot placement is very important to achieve small, fine structures such as for example a 3% point on a 1501 pi printer.

A dot position accuracy of 3 μm can be achieved.

The print head can address every desired location on the substrate. The inkjet recording process is controlled from a computing device steering the print head and the actuators generating the droplets.

The drops are jetted according to the desired pattern to be generated on the printing plate, resulting in a layer formed by the drops. Upon this layer a second layer can later be added.

Immobilisation Step

Just after the deposition of the drops by the inkjet printhead they are e.g. exposed to curing radiation. This provides immobilisation and prevents runout of the drops which would result in an inferior image. Immobilisation is done before the next layer is added over the recorded layer.

This second step is done by a curing system which comprise at least one radiation source for exposing the freshly jetted drops to the curing radiation. The curing may be continuous but other possibilities are possible.

Following curing parameters can be controlled by the computing device resulting in differential characteristics of the resulting material:

Interval time between jetting and curing.

When a drop hits the substrate it adheres to it. Due to speed of the drop and surface tension of the liquid the form of the drop will not be stable at once. Only after a while the drop will reach a constant form. Depending upon the characteristics of the substrate it is possible that later on the drop will be (partially) absorbed by the substrate. In a similar way this is also the case for putting a drop on a cured ink structure. As it is the intention to obtain a controlled relief image, immobilisation has to be performed rather quickly. The time between jetting and immobilisation has to be less than 10 seconds. Preferably immobilisation (curing) is done in a time interval of less that 1 second.

Intensity of exposure to curing radiation.

It can be easily understood that the intensity and type of the curing radiation will have an effect upon the time needed for curing.

The time between jetting and curing is especially important a the drop tend to spread after it has settled on the substrate. In order to provide a fast immobilisation, the e.g. the source of the curing radiation is provided immediately after the recording head. This can be done by mounting the radiation source at the side of the recording head. As drops are jetted they are immediately immobilised afterwards. This is called in-line curing. The combined jetting and immobilisation step are closely intertwined and are performed simultaneously.

Radiation Intensity

An other important consequence of the curing process is that drops jetted on the plate will have a different shape depending upon the intensity of the curing radiation. The radiation intensity influences the immobilisation time. This is illustrated in FIGS. 4*a* to 4*c*.

Figure 4A:
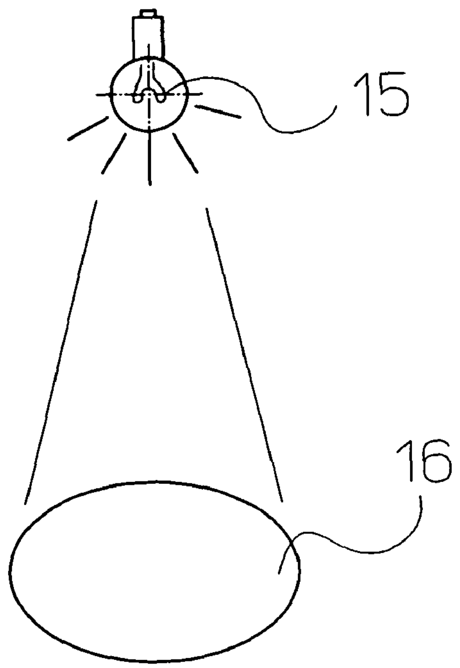
FIG. 4 shows the relation of the curing radiation intensity and the resulting dot height and form factor.

Illustrated in FIG. 4*a* is a UV lamp 15 forming a spot 16 for curing jetted dots. The size of the spot is sufficient to cover the length of the nozzle array so that all jetted dots can be cured by the UV spot.

Figure 4B:
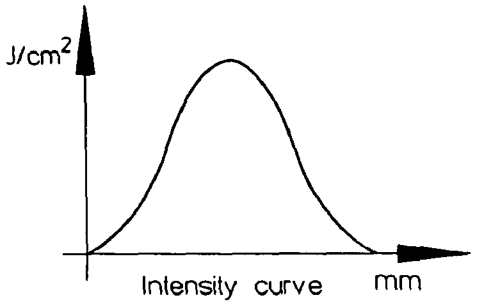

FIG. 4*b* illustrates the intensity profile from the UV spot. The intensity curve has the form of a gaussian curve.

Figure 4C:
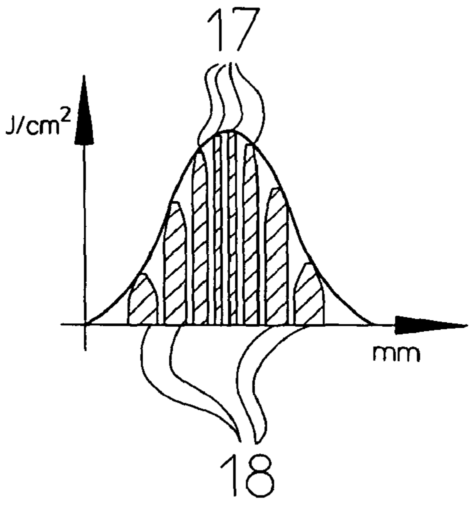

FIG. 4C illustrates the effect on the jetted dots.

Centre dots 17 receiving a high intensity radiation are rapidly immobilised and form high sharp dots while side dots 18 will be immobilised slower and exhibit more run-out, forming lower and broader dots.

Lamp power is preferably in the 10-200 W range.

Wavelength of the Curing Radiation.

Long wavelength radiation (e.g. UV-A, that is, 320 nm to 400 nm) tend to penetrate more deeply into the material and is better suited for final curing of a finished material while short wavelength radiation (e.g. UV-C) penetrates less deep and is suited for providing a droplet only with cured outer layer (skin curing).

By changing the curing parameters the resulting properties of the online cured material can be controlled.

The curing is preferably not complete in order to obtain a good cohesion between the jetted drops of the consecutive layers deposited by the inkjet print head.

Several types of UV curing lamps can be used. The basic mercury bulb, denoted by H, has a widespread distribution of energy, but with strong emission in the short wavelength region. This makes it especially useful in curing clear coatings and thin layers of inks. The D bulb has it's mass of output in the longer wavelength region making it more suited to curing thicker coatings and ink systems. It should also allow better transmission of UV light through plastic materials. The D bulb can be used to achieve a good cure depth. In general cure doses may be reduced somewhat as higher intensity is sources are used.

Additionally, superior cure may be obtained by use of combinations of UV sources. Longer wavelength sources (iron or gallium doped) will offer better through cure" due to the better penetration of the light through the pigmented ink layer. If this long wavelength exposure is combined with more broadband exposure from a typical medium pressure wavelength source (for superior surface cure) then overall doses may be reduced and line speeds increased. Specific trials will be necessary to ascertain optimum cure conditions. A typical dose required with an iron doped medium pressure mercury lamp ("D" bulb/spectrum) when curing an 8-15 μm thick layer is about 300-700 mJ/cm$^2$.

By steering the curing parameters certain effects can be obtained.

By using a frequency of curing radiation having a limited penetration power the drops will be only cured at the outside resulting in skin-curing. This is used for immobilising the recently jetted drops and could be done with a very low intensity or a very small light source which could perhaps shuttle with the print heads.

By changing intensity and length of the curing radiation the degree of curing of the photosensitive composition can be controlled resulting in a differential hardness.

The basic idea is that when only a partial depth curing is done, the number of cross linked monomers is lower and the elasticity becomes higher within a certain range. This is also important in order to provide sufficient cohesion between successive jetted layers Another aspect to be taken into account is the orientation of the bundle of curing radiation. Jetted liquids or substrates can cause scattering of the curing radiation (UV, . . . ). If scattered radiation reaches the nozzle plate of the inkjet print head. Nozzles will tend to block easily. Therefore the bundle of curing radiation preferably is kept away from the print head and has an orientation pointing away from the printhead.

Temperature Management

Another important aspect is the working temperature of the system. Preferably the ink is heated above room temperature in order to improve the jettability of the ink. Especially when thermoplastic materials are included in the ink, it is advantageously to heat the ink to obtain a lower viscosity.

Another preferred feature of a method according to the present invention is that the substrate, i.e. support and intermediate layers, including previously jetted and immobilised layers, is cooled before and/or during recording. The lower temperature of the substrate on which the drops are jetted helps in temporarily immobilising the drops by cooling them down, preventing further runout before the immobilisation step fixes the drop by e.g. curing radiation. The substrate is preferable cooled to a temperature between 5 and 25° C.

In view of the temperature factor it is desirable that curing radiation, e.g. UV radiation, is generated using a cold UV source. This means that wavelengths outside of the UV spectrum, especially Infrared radiation (1R), generated by the UV source, usually a high temperature radiator, are filtered out to ensure that they do not reach the recording surface and provide no heating of the substrate.

The filtering can be done using appropriate optical filters in reflection or transmission mode absorbing IR radiation.

Building of a Layered Structure

Recording can be done layer after layer, gradually building the flexographic printing plate. The distance of the print head to the plate can also be controlled. The exact positioning of the drop may vary upon the distance between the inkjet nozzle plate and the receiver, therefor it is necessary to maintain the correct distance if a reliable positioning of the drops is required.

Inexact positioning may be caused by nozzles having a deviating firing direction.

Another important feature is that the positioning of a drop in a scanning inkjet system depends greatly on the time of flight a drop has before it hits the recording surface, this is the time between firing of the droplet and the moment the droplet hits the receiving surface.

This is due to the fact that the droplet not only has a movement towards the receiver but also a transversal speed over the receiver.

In order to ensure good registration of the layers subsequently recorded on a receiver several approaches can be used:

The distance to the recording surface has to be kept constant.

This can be done by moving the recording head up and down as illustrated in FIGS. 2A to 2B or an up and down movement of the table can be used.

When distance is not kept constant, time of flight of the droplets will become shorter, normal droplets will reach the receiver sooner.

This would lead to distortion of the image. Certain countermeasurements can be taken to avoid this:

adapt the image data, delay firing pulses, which corresponds to repositioning of the recording head over the plate. Some constraints to possible distances exist as some multilevel systems use several small drops which merge in flight.

When building a base layer on top of the support by ink jet recording the distance of the print head to the receiver can be kept to a fixed distance providing a lower accuracy.

A normal recording distance is about 1 mm.

Normally the printing plate structure is gradually built layer by layer. First the bottom layers of the plate are recorded, the distance of the print head is corrected for taking into account the thickness of the preciously recorded layers and subsequent layers are added on top of the others.

However in order to obtain different plate structures it is possible to record a partial bottom layer using a first type of ink whereafter a continuous layer is recorded over the first one. The distance of the print head has to be dynamically controlled during recording of the continuous layer over the image-wise layer to maintain a correct distance above the areas having layers of the first ink recorded and the areas without a first ink coverage.

Measurement and Correction Circuit

A further aspect of the present invention relates to control of the topography of the printed layers. This can be the overall topography regarding image content or to micro-topography elements such as the surface finish of the printed layers or the finished product. The printed image can be checked by e.g. a laser profilometer in order to control the correctness of the obtained product.

The measurements can be done only at the final stage or regular checks can be made to detect defects in the printing plate being built by the subsequent layers.

The micro-topography can be measured using commercial available measurement systems.

This information can be obtained by measuring directly the height of the build layers or by measuring the layer thickness. A possible measurement system is described in : "Koaxiale interferometrische Schichtendickenmessung" Photonik 9/2000 by Dr. Gerd Jakob JURCA Optoelektronik GmbH. The system has shown measurement ranges of up to 300 μm with a resolution of 10 nm and even details within an area of 0.1 mm×0.1 mm can be imaged.

Other systems show a measurement range of 500 μm with a resolution better than 0.01% having a light spot diameter of 1 μm. Measurement systems are normally based upon a contactless measuring process wherein thickness or distance is calculated based upon detected reflections of (laser) light upon layer boundaries. Known system can be adapted or new system can be designed to provide fast and reliable assessment of the height of the jetted layers over the whole surface of the plate with the needed resolution and speed. The profilometer 11 can be mounted with the printhead on the same shuttling carriage as indicated in FIGS. 2*a* and 2*b*. A separate profilometer 11 can also be provided as indicated in FIG. 2*c*.

The measured data is fed back to the recorder where the plate profile is compared to the desired profile for the printing plate. Out of the difference for each location of the printing plate it can be determined how many additional layers need to be jetted on that location.

The measurements can be performed during the jetting of the plate or measurements can be done in between the several recording steps. The frequency of measurements steps can be set at any desired level. Preferably more measurements will needed during the final steps of recording the plate in order to obtain the desired profile.

This system allows several additional feature not possible using prior art systems The height of the different features of the printing plate can be exactly controlled an adjusted. Possible advantages can be generated by this feature.

Small dots which are likely to be lost during printing can be given an extra height relative to the solid printing areas to ensure that the dots will be printed and they are not susceptible to premature wear during printing.

As the profilometer is capable of measuring areas as small as 1 μm it is possible to detect the surface roughness.

When surface roughness is measured and is not in the desired range, this can be corrected by an additional jetting of small drops on the top layer correcting the deviating roughness.

This is also illustrated in FIG. 2*c*. For each location on the printing plate 7 the height is measured by the profilometer 11. Preferably this information is fed back to the recording device where the measured values are compared with the target values from the image input device for the printing plates. Further data for the inkjet printing system can be generated by the recorder to correct the printing plate (in pattern and height) by printing successive correction layers until the desired profile is obtained. The topography of a generated plate 7 can be accurately controlled and adjusted.

Because the printing system has multilevel capabilities it is possible to use large drops to obtain quickly a profile close to the desired final profile whereafter small drops are used for fine tuning the height and roughness of the plate elements and the surface roughness.

It is also possible to use a binary print head jetting drops of 80 pl to quickly obtain a profile close to the desired profile and later on switch to an other print head to record the desired details.

Figure 5:
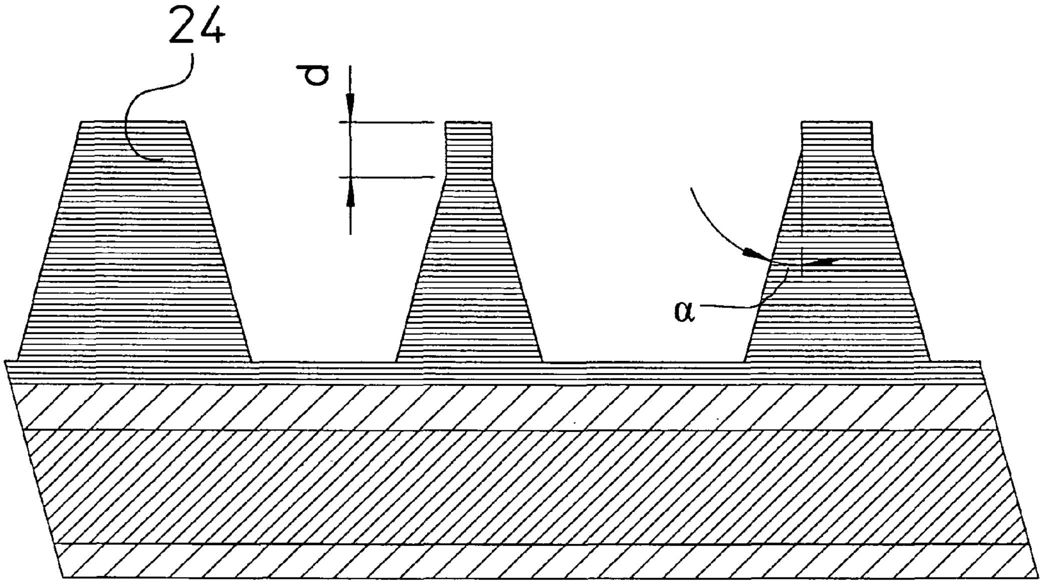
FIG. 5 gives an example of an obtainable topography of a printing plate with slope control.

Using the inkjet printing method and the laser profilometer it is also possible to exactly control the angle α of the slopes forming the edges around the printing regions. As can be seen in FIG. 5 by building the plate layer by layer a good control over the topography can be obtained. The slopes around an print area partially influence the characteristics of the print area, especially for small dots which need to be printed. It is thus possible to give the slopes around a small dot a non-linear character to provide sharp dots but providing sufficient physical support for the dot while printing. Slopes around solids 24 can be continuous or can be made steeper.

Every angle α of each dot or solid 24 can be controlled by the recording software. Even opposite sides of a dot or solid 24 can be given a different angle α.

In FIG. 5 the vertical section with a height d provides less image contamination due to ink adhering to the side of the dots while the sloped portion provides support for the dot during printing. Slope characteristics may be determined by the E-modulus and inertia moment of the material determining the formstability of the material.

Figure 1:
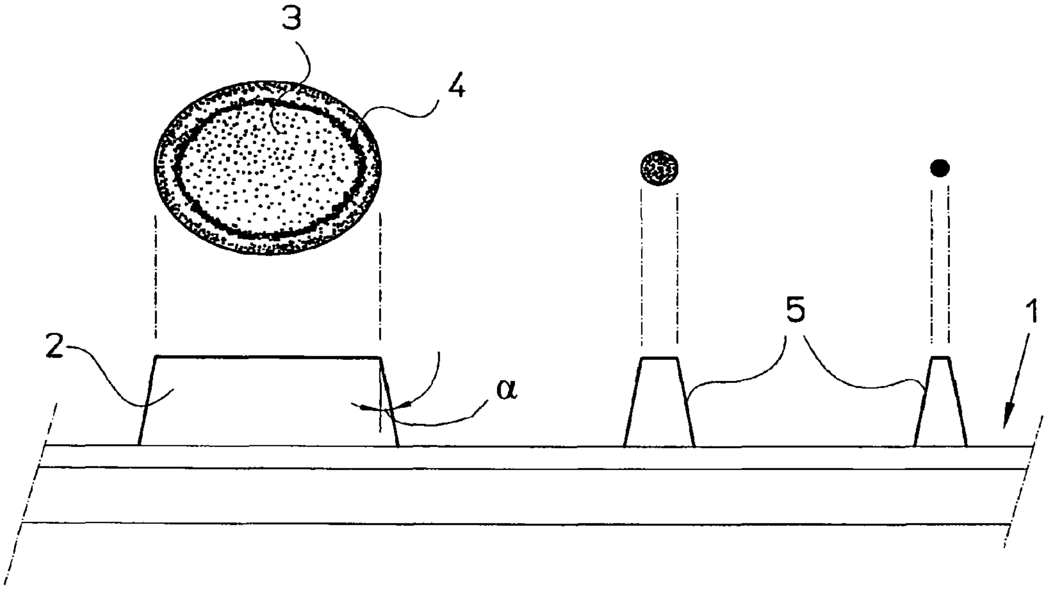
Fig 1 Prior Art
FIG. 1 shows a section of a state of the art flexographic printing plate and the resulting print.

In contrast FIG. 1 illustrates the fixed slope angle of the prior art photomechanical printing plates.

Differential Properties

Figure 6:
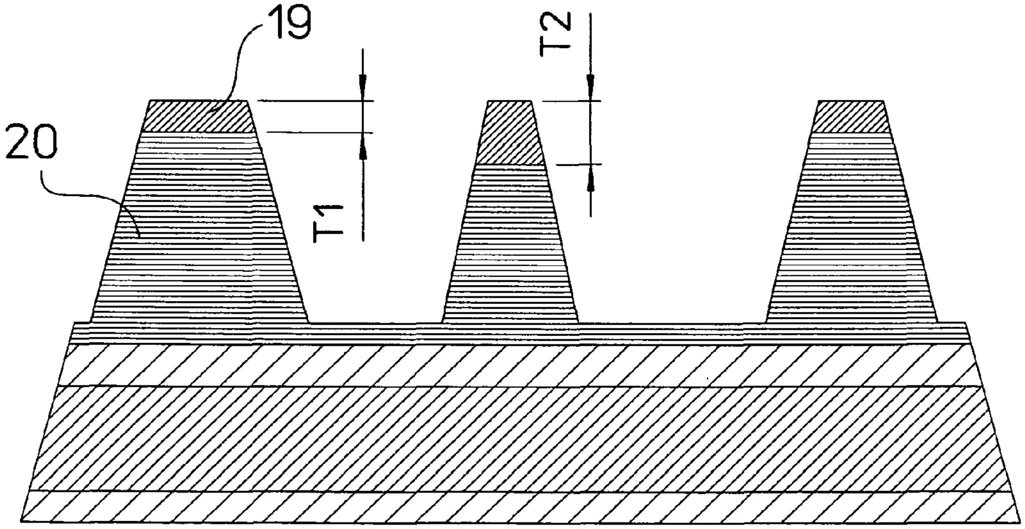
FIG. 6 shows areas of a printing plate having different layer thickness and having differential elasticity.

In order to obtain a better flexographic printing plate it is preferable to use regions or layers having a differential elasticity. This gives the opportunity to obtain several advantageous features. Possible features of which some are illustrated in FIG. 6 are:

- The upper layer 19 of the printing plate 7 which comes into contact with the printed substrate can be given a greater hardness (less elasticity) in order to avoid wear of the printing plate during printing while lower portions 20 have a high elasticity and resilience.
- Certain levels in the plate can be given a lower elasticity to obtain a lateral cohesion of the plate.
- Areas containing small dots may be given a greater hardness (less elasticity) to ensure good contact with the printed material in contrast to areas containing solid fields which can be more elastic. Not only the characteristics of overlying layers can be controlled but also the properties of different regions of the plate. This can e.g. be done by applying non overlapping image-wise layers with different properties resulting in e.g. two adjacent layers with different characteristics. Preferably the location dependent characteristics are automatically coupled to the image content
- By providing different layer thickness as shown in FIG. 6 it is possible to give different areas of the plate different characteristics. Small dots are provided with a upper layer having thickness T2 while solids receive a upper layer 19 having a smaller thickness T1

This differential elasticity can be obtained in several ways: Using photopolymeric inks having different properties, e.g. using different binders, the final wear resistance and elasticity of certain regions or layers can be controlled.

Using differential curing of several layers can also provide different properties of these layers. As mentioned earlier this can be done by changing curing wavelength (UV spectrum), curing time, intensity of the radiation, time interval between applying the layer and curing, . . .

The elasticity or hardness characteristics can also be influenced by changing the internal structure of recorded layers.

Certain characteristics can be obtained by building a layer only using small droplets on top of each other while using only large drops or a mixture of small and large drops will result in clearly different characteristics. Even methods for drop deposition using certain patterns and drop sizes can be constructed resulting in structure having a certain porosity.

The obtained structure is a result of the recording method, drop placement, types of inks used and curing parameters.

It is clearly an advantage that differential characteristics may not only differ in layers above each other, but also in parts of the plate next to each other, eventually depending upon image content.

Sacrificial Layers

A special type of structure is making use of at least one ink for finally forming the plate, and at least one ink as temporary filler whereon other plate-forming layers can be jetted. The temporary filler forms a sacrificial layer 21 enabling forming of structures which could not be possible using a single ink.

Figure 7:
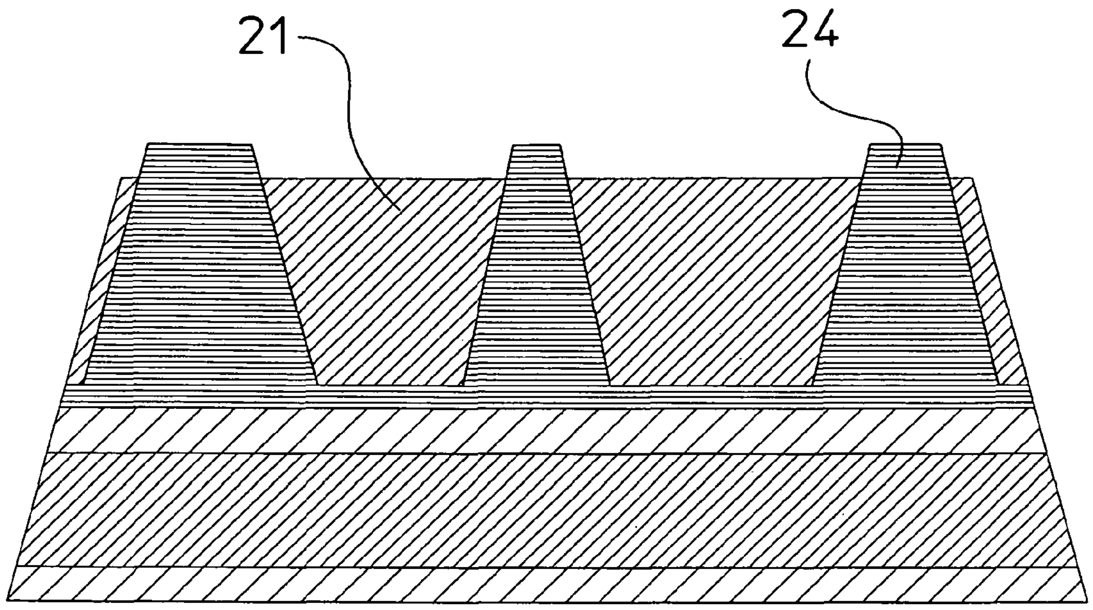
FIG. 7 shows the building of a printing plate profile using a sacrificial layer.

An example of a possible combination is shown in FIG. 7. The filler substance of the sacrificial layer 21 can then later be removed by an appropriate process, e.g. melting, dissolving, etc. This method can be used for forming special cavities in the final product influencing the plate characteristics. In another possible embodiment the temporary filler can be used to support small dots during the fabrication of the plate preventing run-out of the fresh jetted dots or collapse of the jetted structures before final curing. After final curing the small dots are more stable and the filler can be removed.

Top Layers and Coatings

In other embodiments it is also possible to control other characteristics. In order to improve ink acceptance of the top layer a jetted composition giving oleophilic properties to the top layer can be used.

Other layers having desirable characteristics can be applied.

An extra layer on top of the image areas or even over the whole plate can of course be applied by any coating method.

By using other methods such as Chemical vapour deposition, overall spraying, etc . . . , many more coatings types and characteristics are possible than when using only jettable coatings.

Another possibility is the application of an overall oleophobic layer over the entire printing plate. Afterwards the oleophobic layer is grazed away from the top layer to reveal the original jetted layers. This results in a ink repellent printing plate having ink accepting image-wise top layer. Such a structure is less vulnerable to smearing i.e. the spreading of ink over areas of the plate and/or substrate where it is not wanted.

Final Curing

When the printing plate is finished, normally a final curing step is performed to ensure that the properties of the plate will remain constant. When partial curing is used the plate characteristics will normally change in time due to the curing process which will gradually proceed. This is usually avoided by the final curing process. Preferably curing radiation with a long wavelength, (e.g. UVA, that is, 320 nm to 400 nm) is used as this provides better penetration of the jetted plate. This can be done by a separate final curing radiation source 22 illustrated in FIG. 2C.

However it can be desirable not to perform a final curing step. This can depend on e.g. the degree of curing in between the application steps.

EXAMPLE 1

A PET layer of 200 μm is coated with a 1,2 mm thick layer of Santoprene™ B100 to form a elastic, resilient base layer.

Upon the Santoprene™ layer ink layers were jetted using an ink-jet printhead 9 with a resolution of 720 dpi and using drops having a volume of 3 pl.

The ink used was an UV curable ink Crystal UFE 7577™ ink of Sun chemicals having an enhanced elasticity.

Subsequent layers are jetted upon each other while preliminary curing is performed in between the jetting of subsequent layers using a "D" bulb radiation.

The resulting relief upon the base layer was gradually recorded obtaining a relief difference of a least 0,15 mm to avoid fogging of large non-printing areas during printing using the obtained plate.

The obtained relief was measured using a Jurca CHR 150 N™ 3-axis measurement system and final correction were made to the plate by jetting extra layers to areas where the measured topography did not yet match the desired relief.

Final curing was performed using "D" Bulb radiation exceeding 300 mJ/cm$^2$

EXAMPLE 2

A 175 μm thick support of Polycarbonate is coated with a 1.5 mm layer of Poron™ to obtain a elastic base layer.

Upon the base layer layers are jetted using a multilevel inkjet recording head having a resolution of 720 dpi with variable drop volume of 3 to 50 pl. A printing relief is created by jetting subsequent layers of an UV curable ink Crystal UFE 7577™ ink of Sun chemicals forming a layer of about 0.2 mm having a relief of at least 0.15 mm. After jetting the relief a supplementary layer of 0.5 mm is jetted of the top of the printing portions using an ink Crystal UGE 7537 of Sun chemicals. In between the jetting of the layers the jetted drops are preliminary cured using "D" bulb radiation. After finishing the recording printing plate having a relief of more than 0.2 mm was obtained. A final curing step was performed using a radiation dose of more than 700 mJ/cm$^2$.

Alternative Embodiments

Another known problem is that small dots next to a solid area or in between two solids tend to disappear in the printed product because, due to lateral cohesion of the printing plate, the compression of the plate at the location of the solids also caused a certain compression of the plate under the nearby dots rendering them less stable during printing.

Figure 8:
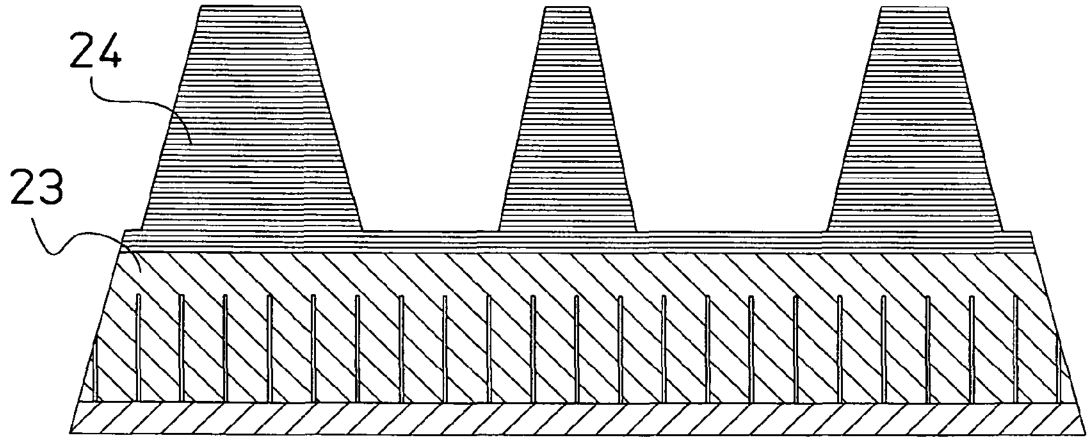
FIG. 8 shows a possible printing plate having lower lateral cohesion by use of physical separations.

Shown in FIG. 8 is a possible method to lower the lateral cohesion of the printing plate is by creating a physical separation between the areas in the printing plate.

This can be done by a calandering process. The foam or elastomeric layer 23 provided on a substrate can be easily cut into small islands using a special calander roll.

A drawback in this method could be that the top side of the base layer now has a fine mesh of cuts wherein the ink infiltrate of be drawn by e.g. capillary forces. This can be avoided by calandering a separate foam or base layer and laminating or gluing the base layer to the substrate with the cuts oriented to the substrate to the top side of the base layer has no voids due to the calandering process.

When recording solids over these islands lateral cohesion is restored. When small dots are recorded on a single or a small number of islands they are no longer influenced by the compression of nearby solids situated on other grouped islands.

Other embodiments can be constructed depending upon the materials used.

Curing of certain photosensitive compositions can be done by using electron beam curing, IR curing. In another possible embodiment the droplets can be immobilised in another way until final curing is done.

Above mentioned methods can be used off-line and printing plates can be produced in advance before printing. Obtained printing plates can be mounted on special sleeves allowing easy and quick mounting on the press without much trouble regarding to register problems.

In a possible embodiment the process can be executed on press which provides even a better register control.

Cleaning system should be provided on press in order to re-prepare the substrate for recording.

It is possible to provide using the on press system a method for rejuvenating flexographic printing plates. When the operator or a measurement system detect that the quality of the printed result deteriorates, due to wear of the plate, a rejuvenation procedure can be started.

cleaning the plate for removing the ink, e.g. by running the plate dry.

measuring the printing topography, comparing the measured topography to the desired relief of the plate, re-recording worn out parts of the printing plate.

Printing can be resumed afterwards with the restored flexographic plate.

In another embodiment re-recording can be controlled by measuring the printed product.

Having described in detail preferred embodiments of the current invention, it will now be apparent to those skilled in the art that numerous modifications can be made therein without departing from the scope of the invention as defined in the appending claims.

Reference Numbers:

1. Printing plate
2. Solid
3. Reproduction of a solid
4. Halo effect
5. Dots
6. Table
7. Printing plate
8. Frame
9. Printhead
10. Light source
11. Profilometer
12. Translation system
13. Drum
14. Motor
15. UV lamp
16. UV spot
17. Centre dots
18. Side dots
19. Upper layer
20. Lower portions
21. Sacrificial layer
22. Final curing radiation source

The invention claimed is:

1. A method for making a flexographic printing plate using an inkjet printing system comprising the steps of:

applying at least a first image-wise layer of ink on a substrate with drops of ink from the inkjet printing system;

immobilizing by radiation curing the drops of ink of the first image-wise layer, wherein the time between the applying and the immobilizing each of the drops of ink in the first image-wise layer of ink is less than 10 seconds;

controlling a print head of the inkjet printing system to keep a distance from the print head to a top recording surface that receives the drops of ink constant;

applying at least a second image-wise layer with drops of ink on the first image-wise layer of ink after the step of immobilizing the first image-wise layer; and immobilizing by radiation curing the drops of ink of the second image-wise layer, wherein the time between the applying and the immobilizing each of the drops of ink in the second image-wise layer is less than 10 seconds; wherein the at least a first image-wise layer and the at least a second image-wise layer form a relief on the substrate containing at least one dot including a top print area and a side having a non-linear slope with respect to a vertical direction perpendicular to the substrate thereby obtaining the flexographic printing plate, the non-linear slope of the side providing sufficient physical support for the at least one dot during a flexographic printing process.

2. The method according to claim 1, wherein the ink in the step of applying the first image-wise layer has a different composition from the ink in the step of applying the second image-wise layer.

3. The method according to claim 1, wherein the step of immobilizing the first image-wise layer has a different immobilizing time than the step of immobilizing the second image-wise layer.

4. The method according to claim 1, wherein the step of immobilizing the first image-wise layer has at least one of a different intensity of curing radiation, a different exposure time to curing radiation, or a different wavelength of curing radiation than the step of immobilizing the second image-wise layer.

5. The method according to claim 1, wherein the ink used in each of the applying steps is UV radiation curable, and each of the immobilizing steps include delivering UV radiation by a UV source.

6. The method according to claim 5, wherein wavelengths outside of the UV spectrum are filtered out to avoid heating of the substrate.

7. The method according to claim 1, further comprising the step of:

cooling the substrate during at least one of the applying and immobilizing steps.

8. The method according to claim 1, further comprising the step of:

measuring a height of at least the first image-wise layer thereby generating measurement data.

9. The method according to claim 8, further comprising the step of:

feeding back the measurement data to a feed-back loop to adjust image content of at least the second image-wise layer.

10. The method according to claim 9, wherein the substrate is a used flexographic printing plate, and the method further comprises the step of:

feeding back the measurement data to the feed-back loop to adjust the image content of at least the second image-wise layer in order to re-apply worn out portions of the used flexographic printing plate.

11. The method according to claim 1, further comprising the step of:

controlling image content of at least one of the first and second image-wise layers to control the slope of the side of the at least one dot.

12. The method according to claim 1, further comprising the steps of:

applying an overall oleophobic coating layer over the relief formed on the substrate; and removing the oleophobic coating from an area on top of the relief to reveal the underlying relief.

13. The method according to claim 1, wherein the substrate includes an elastomeric base layer arranged to receive at least the first and second image-wise layers of ink, and further comprising the step of:

providing physical separations in the elastomeric base layer such that the elastomeric base layer includes areas having no lateral cohesion wherein compression of the flexographic printing plate in one area does not also cause compression of the flexographic printing plate in a nearby area.

14. The method according to claim 1, wherein the inkjet printing system is a multilevel inkjet printing system that jets drops of ink having a variable but controllable volume.

15. The method according to claim 1, further comprising the step of:

finally curing at least the first and second image-wise layers using UVA radiation having a wavelength from 320 nm to 400 nm.

16. The method according to claim 1, wherein the at least one dot includes an upper portion having a linear side defining a first angle with respect to the vertical direction and a bottom portion having a linear side defining a second angle with respect to the vertical direction, the second angle being different from the first angle.

17. The method according to claim 16, wherein the linear side of the upper portion is a vertical section such that the first angle is 0° with respect to the vertical direction.

18. The method according to claim 1, wherein the time between the applying and the immobilizing a drop of ink is less than one second for the first and second image-wise layers of ink.

19. The method according to claim 1, wherein the substrate is a sleeve sized to fit over a drum.

20. The method according to claim 1, wherein the relief contains at least one other dot also including a top print area and a side having a constant slope from the top print area of the at least one other dot to a bottom of the at least one other dot and defining an angle with respect to the vertical direction.

* * * * *